(12) United States Patent
Thomas et al.

(10) Patent No.: US 11,286,045 B2
(45) Date of Patent: Mar. 29, 2022

(54) CANOPY CONTROL SYSTEM

(71) Applicant: Animal Dynamics Limited, Oxford (GB)

(72) Inventors: Adrian Thomas, Oxford (GB); Alexander Coltman, Oxford (GB)

(73) Assignee: Animal Dynamics Limited

(*) Notice: Subject to any disclaimer, the term of this patent is extended or adjusted under 35 U.S.C. 154(b) by 0 days.

(21) Appl. No.: 16/883,799

(22) Filed: May 26, 2020

(65) Prior Publication Data

US 2020/0307782 A1 Oct. 1, 2020

Related U.S. Application Data

(63) Continuation of application No. PCT/GB2018/053378, filed on Nov. 22, 2018.

(30) Foreign Application Priority Data

Nov. 29, 2017 (GB) .................................. 1719858

(51) Int. Cl.
*B64C 31/036* (2006.01)

(52) U.S. Cl.
CPC .................................. *B64C 31/036* (2013.01)

(58) Field of Classification Search
CPC .................................................... B64C 31/036
See application file for complete search history.

(56) References Cited

U.S. PATENT DOCUMENTS

| 3,140,842 | A | 7/1964 | Craigo et al. | |
|---|---|---|---|---|
| 4,865,274 | A * | 9/1989 | Fisher | B64D 17/025 244/152 |
| 6,082,671 | A | 7/2000 | Michelson | |
| 6,206,324 | B1 | 3/2001 | Smith | |
| 6,224,019 | B1 * | 5/2001 | Peterson | B64D 17/36 244/138 R |
| 6,505,793 | B2 * | 1/2003 | Schwarzler | B64D 17/34 244/142 |
| 6,565,039 | B2 | 5/2003 | Smith | |
| 6,783,097 | B1 | 8/2004 | Smith | |
| 7,172,159 | B1 * | 2/2007 | Zapirain | B64D 17/34 244/137.3 |

(Continued)

FOREIGN PATENT DOCUMENTS

| CN | 106585983 A | 4/2017 |
|---|---|---|
| DE | 19634017 A1 | 2/1998 |

(Continued)

OTHER PUBLICATIONS

PCT/GB2018/053378 International Search Report and Written Opinion dated Jan. 29, 2019.

*Primary Examiner* — Justin M Benedik
(74) *Attorney, Agent, or Firm* — Bochner IP, PLLC; Andrew D. Bochner

(57) ABSTRACT

Provided herein is a canopy control system comprising a yoke, configured to be pivotably securable to a vehicle and securable to a line system of a canopy in use, such that the yoke pivots with respect to the vehicle in a first direction when the canopy is subjected to a wind force; and a control mechanism configured to apply a control force to the canopy line system to cause the canopy to oppose the wind force, such that yoke pivots with respect to the vehicle in a second direction which is opposite to the first direction.

14 Claims, 6 Drawing Sheets

(56) References Cited

U.S. PATENT DOCUMENTS

| | | |
|---|---|---|
| 8,205,823 B2 | 6/2012 | Keennon et al. |
| 9,290,268 B2 * | 3/2016 | Ratti et al. |
| 9,868,537 B2 * | 1/2018 | Leidich .............. B64D 17/343 |
| 9,975,644 B1 | 5/2018 | Kimchi et al. |
| 10,017,248 B2 | 7/2018 | Samuel et al. |
| 2007/0018051 A1 | 1/2007 | Zapirain |
| 2008/0128558 A1 | 6/2008 | Hardham et al. |
| 2016/0159477 A1 | 6/2016 | Deng et al. |
| 2017/0183092 A1 | 6/2017 | Keennon et al. |
| 2019/0210724 A1 | 7/2019 | Bublitsky |

FOREIGN PATENT DOCUMENTS

| | | |
|---|---|---|
| ES | 2536853 | 5/2015 |
| ES | 2536853 A1 | 5/2015 |
| WO | WO-2006054125 A2 | 5/2006 |
| WO | WO-2019106342 A1 | 6/2019 |
| WO | WO-2019126507 A1 | 6/2019 |

* cited by examiner

CANOPY CONTROL SYSTEM

CROSS-REFERENCE

This application is a Continuation of International Application No. PCT/GB2018/053378, filed Nov. 22, 2018, which claims the benefit of GB International Application No. 1719858.1, filed Nov. 29, 2017, both of which are incorporated herein by reference in their entirety.

The present invention relates to a canopy control system, a canopy arrangement and a paramotor. Embodiments of the present invention provide for a stabilisation method for a powered parachute delivery system.

BACKGROUND OF THE INVENTION

Powered air vehicles using soft wings made of fabric, generally known as paramotors, are used for leisure activities and surveillance, and occasionally for air delivery. The low cost and high lift capability of the paramotor design make these vehicles particularly suitable as delivery vehicles, and their capability can be significantly enhanced by designing them to fly autonomously using a control and guidance system following a set of predetermined instructions and/or directed by a remote pilot.

The most significant challenge for users operating an autonomous paramotor occurs when the vehicle is preparing for take-off. During take-off, the wing needs to inflate and sit stably above the vehicle to ensure a successful and safe take-off. Where there is substantially no prevailing wind, (i.e. still conditions), this can be achieved by situating the wing in the propeller air stream so that the wing inflates and is lifted above the vehicle in readiness for take-off. However, in windy, turbulent or cross wind conditions, the wing can have a tendency to become unstable and be difficult to control. This can cause the wing to be blown (pushed) to one side, making take-off unstable, and causing the vehicle to veer.

SUMMARY OF THE INVENTION

In one aspect, the present invention provides a canopy control system comprising:
   a yoke, configured to be pivotably securable to a vehicle and securable to a line system of a canopy in use, such that the yoke pivots with respect to the vehicle in a first direction when the canopy is subjected to a wind force; and
   a control mechanism configured to apply a control force to the canopy line system to cause the canopy to oppose the wind force, such that the yoke pivots with respect to the vehicle in a second direction which is opposite to the first direction.

The present invention further provides a canopy control system, a canopy arrangement and a paramotor as claimed.

BRIEF DESCRIPTION OF THE FIGURES

Embodiments of the present invention will now be described, by way of non-limiting example only, with reference to the accompanying figures, in which.

DETAILED DESCRIPTION OF THE INVENTION

Generally, embodiments of the present invention provide a system to control and stabilise the canopy during inflation and take-off.

Figure 1:
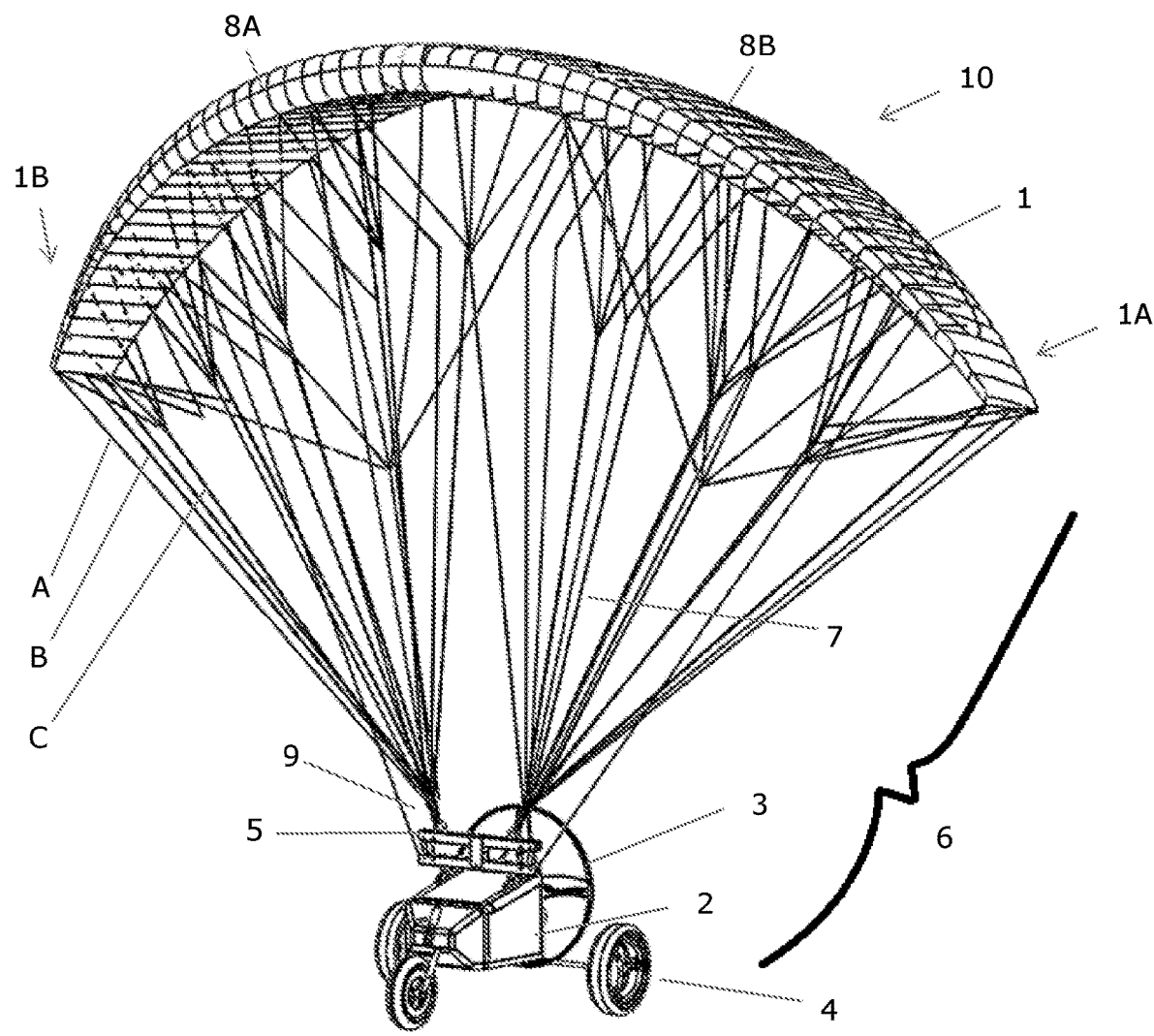
FIG. 1 illustrates a paramotor incorporating a canopy control system embodying the present invention.

With reference to FIG. 1, a paramotor 10 consists of a canopy 1 (also referred to as a wing or sail) and a ground vehicle 2. The vehicle 2 may be a tricycle, or take other forms. The vehicle 2 consists of a vehicle body and carries a propulsion unit 3 (which may comprise, for example, a propeller, jet or rockets). The vehicle further comprises an undercarriage 4 (e.g. skids, tracks or wheels), and the pilot and/or control system.

In flight, the vehicle 2 is suspended from the canopy 1 by a network of lines 7 known as a line system 6. Conventionally, the vehicle 2 is suspended at a pair of attachment points (left and right) on the vehicle 2, or any number of attachment points. The line system 6 then branches up to the canopy 1.

Conventionally, the lines 7 attach to the canopy 1 underside at attachment points arranged in rows across the span, from the leading edge 8A towards the trailing edge 8B. These attached points are often called A, B, C rows, indicated as A,B,C on FIG. 1. This arrangement allows the angle of attack and camber of the canopy 1 to be adjusted by changing the length of the lines 7 attached to one or more rows of lines. To facilitate this control the branching pattern of the lines 7 is arranged so that the lines 7 originating at one row are brought together into a single line (called a "riser" 9) near the base of the line system 6 and close to the vehicle 2 where it can be adjusted.

Conventionally, the line branching pattern of the line system 6 is arranged so that all the lines 7 from all the rows on the left side of the canopy 1 meet in the left set of risers 9, and all those from the right side meet in the right set of risers 9, allowing steering control by adjusting the lengths of the left and right sets of lines 7 asymmetrically. References herein to the line system 6 are generally referring to a system comprising both lines 7 and risers 9.

The rearmost set of lines 7 (those connected to row c) is conventionally attached at or near the trailing edge 8B of the canopy 1 and are used to control the canopy 1 by distorting the canopy 1 by pulling down the trailing edge 8B, which slows the canopy 1 (and these lines 7 are therefore called brakes). To turn, the brakes are applied asymmetrically and the paramotor vehicle 2 rolls and yaws towards the brake that is pulled down.

In flight, the paramotor 10 is controlled using the brakes, accelerator and throttle. The throttle controls the propulsion force (e.g. motor speed) and determines climb and sink rate. The accelerator controls the canopy's angle of attack by adjusting the risers/lines 9, 6 in such a way as to change the angle of attack and/or camber and/or reflex of the canopy 1 and therefore the speed of the vehicle 2. The brakes selectively distort the trailing edge 8B of the canopy 1. Symmetric brake application—i.e. pulling down the trailing edge 8B of the left 1A and right 1B sides of the canopy 1 equally—slows the canopy 1. Asymmetric brake application—pulling down the trailing edge 8B of one side 1A, 1B more than the other 1B, 1A—turns the canopy 1. For example, applying a brake on the right side 1A results in a turn to the right. Turning may alternatively or additionally be controlled by asymmetric adjustment of the accelerator system.

The paramotor 10 can also be controlled in roll and yaw by moving the centre of gravity of the ground vehicle 2 laterally, this imparts a turn towards the loaded side. Moving the centre of gravity towards the right will result in a turn to the right.

The paramotor 10 may be controlled by a pilot onboard, and/or by remote control (for example using a radio control system and servos), or by an onboard autopilot, for example using an inertial measurement unit to identify attitude and heading and/or a GPS and/or a computer vision system to identify track and speed and command adjustment of the brakes, throttle and accelerator so as to execute the required flight path.

During take-off when there is minimal prevailing wind or substantially still air, the canopy 1 is laid out on the ground, behind the vehicle 2, preferably aligned so that the take-off run is straight into any prevailing breeze. The vehicle 2 then accelerates and the canopy 1 rises under aerodynamic forces until it is above the vehicle 2. The vehicle 2 then continues to accelerate until the canopy aerodynamic lift exceeds vehicle weight at which point the vehicle 2 takes off and climbs out.

It is widely recognised that the most difficult part of the take-off procedure is the phase where the canopy 1 rises from the ground. If the canopy 1 rises asymmetrically off to one side, then side forces may be produced that are directed to that side and can cause the canopy 1 to collapse to the ground again, or can drag the vehicle 2 to that side, perhaps even overturning it. This problem is exacerbated during windy conditions, when the canopy 1 rises above the vehicle 2 while the vehicle 2 is stationary before take-off, and can move uncontrollably from side to side. When a paraglider (a pilot having a similar canopy attached to their body) encounters such unbalancing forces during the takeoff procedure, they will typically overcome the effect by moving to the side. However, paramotor vehicles 2 are generally not able to move sideways in this manner, nor at the speed required to oppose or overcome any unbalancing forces.

In flight, the pivoting of the yoke 5 with respect to the vehicle is unlikely to occur, since the paramotor 10 has pendulum stability in flight. A canopy control system embodying the present invention can therefore remain 'active' at all times, even though it will only be needed during takeoff. In one embodiment, there is no requirement to disengage or otherwise prevent the operation of the canopy control system during flight.

The present invention provides means of controlling the canopy 1 during this inflation and/or take-off phase. The invention comprises a mechanical yoke 5 pivotably connecting the canopy to the vehicle 2. A canopy control system according to the claims uses the motion of the yoke 5 relative to the vehicle 2 to impart control movements to the canopy 1 via a control mechanism to generate restoring forces to counteract any asymmetric motion of the canopy 1 or misalignment of the canopy relative to the vehicle 2 while the vehicle 2 is stationary in high wind before take-off and during the take-off run.

Figure 2:
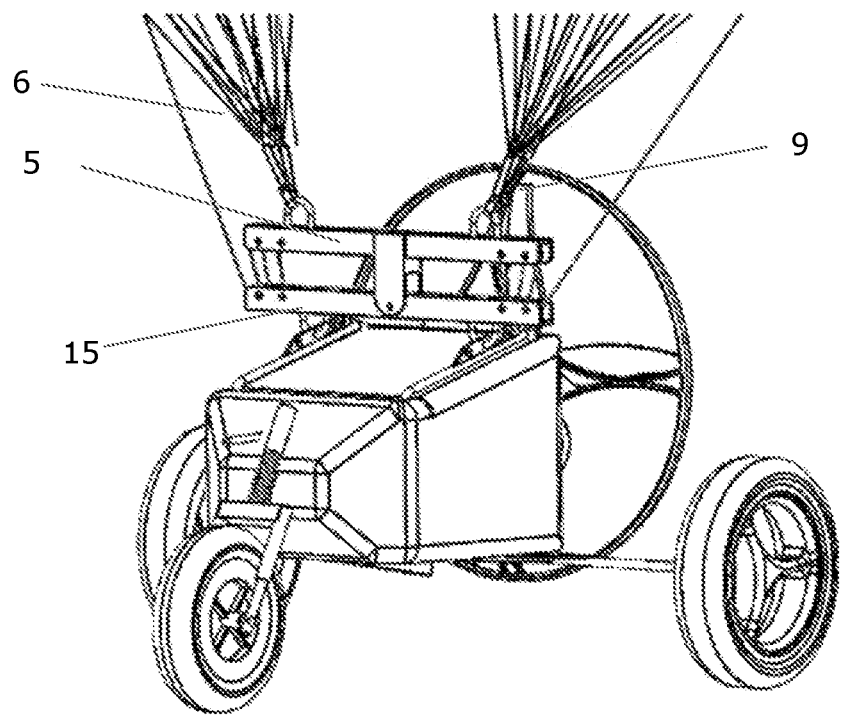
FIG. 2 is an enlarged view of the vehicle and yoke of a canopy control system embodying the present invention.
Figure 3:
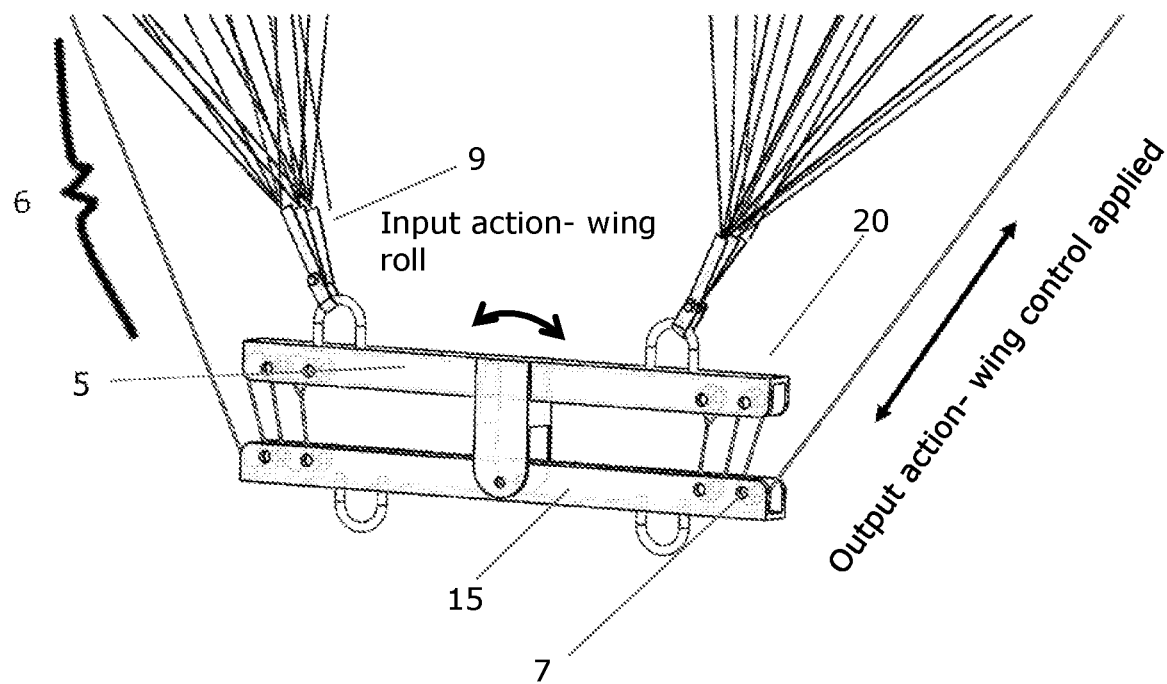
FIG. 3 is an enlarged view of the yoke of a canopy control system embodying the present invention.

In one embodiment as outlined in FIGS. 2 and 3 the invention comprises a system where the canopy lines 6 and/or risers 9 attach to a mechanical yoke 5 pivotably connected to the vehicle 2. In the embodiment shown, the control system further comprises a vehicle mounting 7, which is connected to the vehicle 2. In other embodiments, such as those shown in FIG. 6, 8, 9, 10 or 11, the yoke is pivotably securable to the vehicle directly. The vehicle mounting 7 is not essential.

The yoke is preferably above the pivot point. The pivot point is preferably connected to the vehicle 2 above the centre of gravity of the vehicle 2, so that the vehicle 2 hangs in an orientation that is substantially the same as its orientation in flight. In this embodiment the yoke extends laterally relative to the pivot point.

Figure 4:
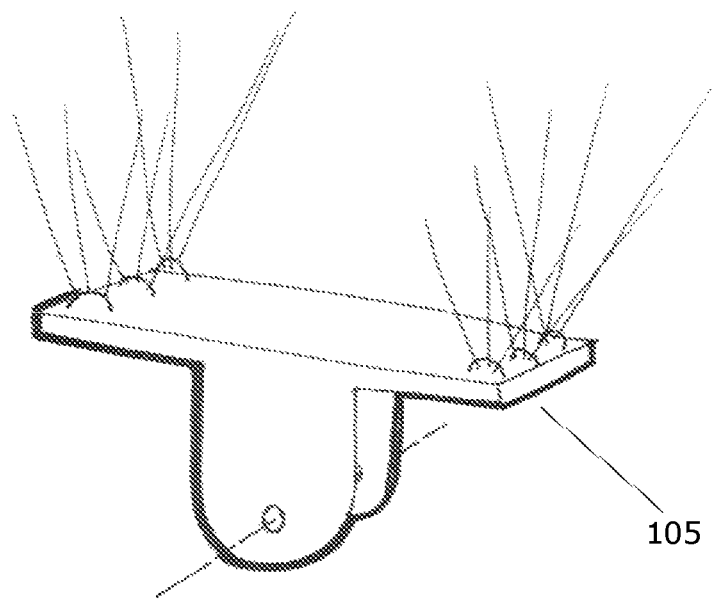
FIGS. 4-11 illustrate alternative forms and configuration of yoke of canopy control systems embodying the present invention.

In another embodiment as shown in FIG. 4 the yoke 105 extends both laterally and in a fore-and-aft direction relative to the pivot point. The yoke 105 takes the general form of a plate.

Figure 5:
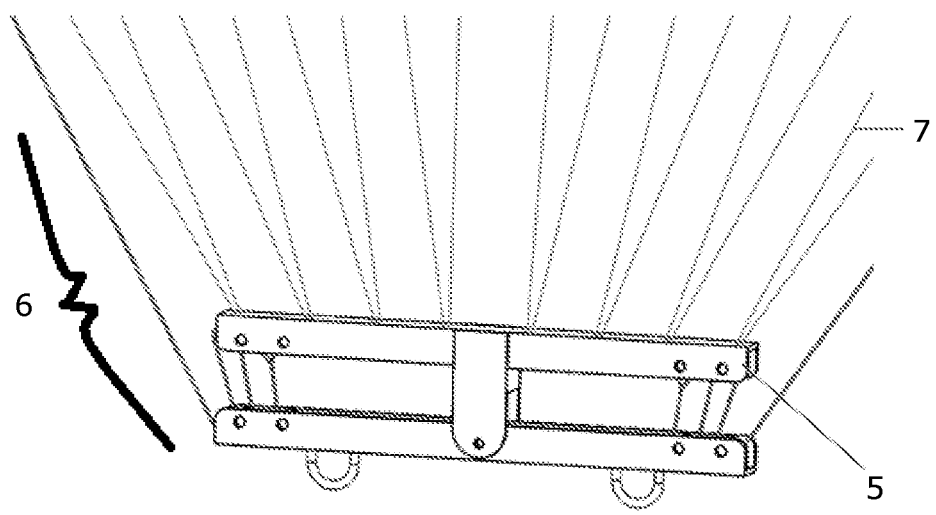
Figure 6:
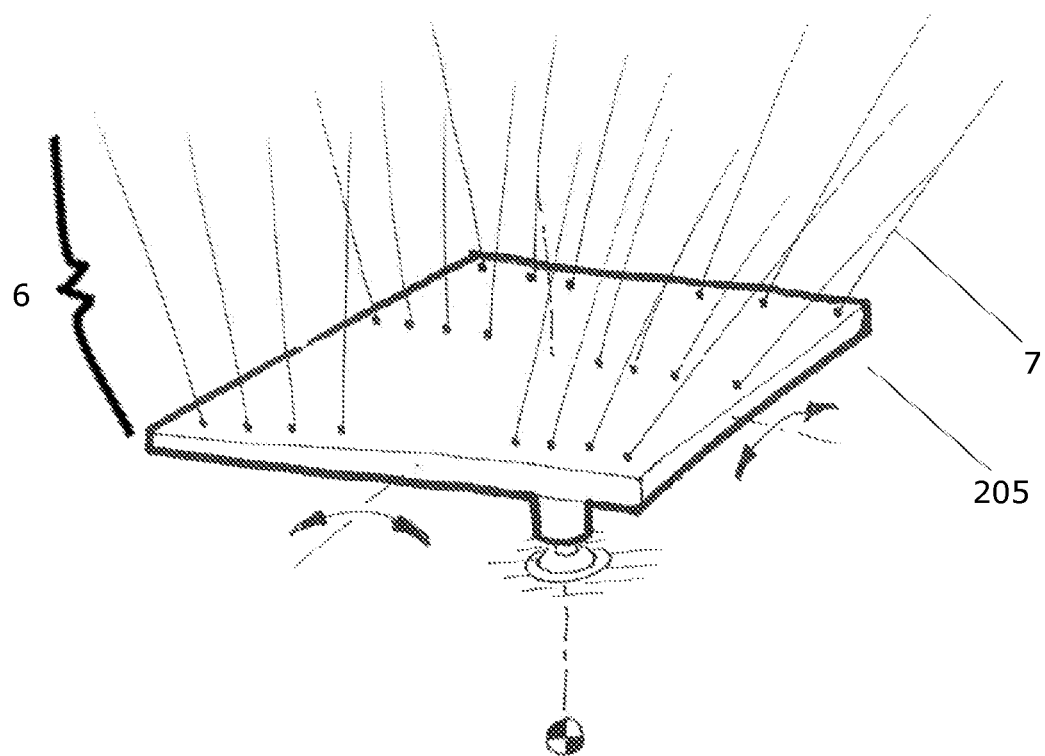

In another embodiment (FIG. 5), the lines 7 attach directly to the yoke 5, and the lines are distributed across the yoke 5 so that the outermost lines on the canopy are attached at the outermost attachment points on the yoke.

In another embodiment (FIG. 6), the lines 7 attach directly to the yoke 205 (i.e. with no riser 9), and the lines 7 are distributed laterally and fore and aft on the yoke 205 so that the lines 7 connecting to the outermost attachment points on the canopy 1 are connected to the outermost points on the yoke. Thus the A lines 7 attach at the front of the yoke 205, the B and C lines 7 further back. Similarly the canopy 1 tip lines attach at the outer extremes of the yoke 205 while the central lines 7 attach at the centre of the yoke 205. The yoke 205 takes the form of a plate.

Figure 7:
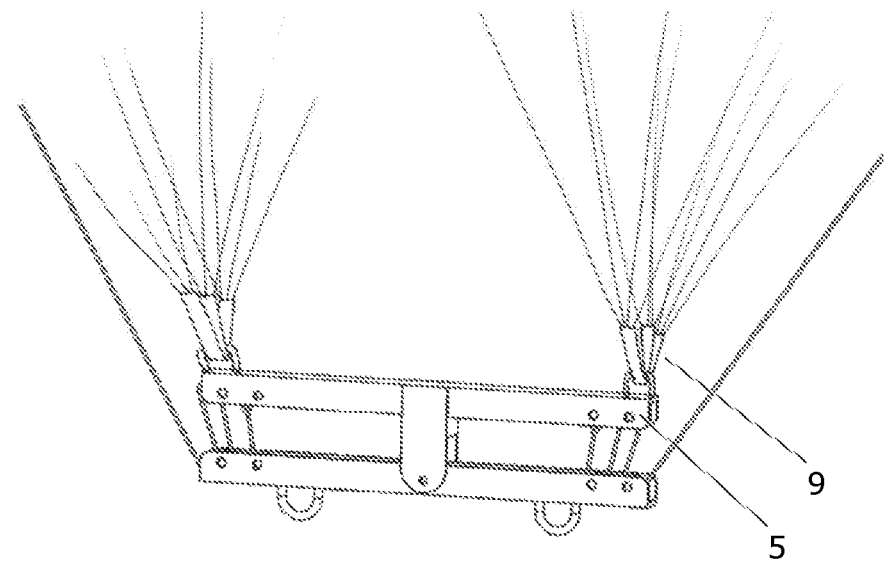
Figure 8:
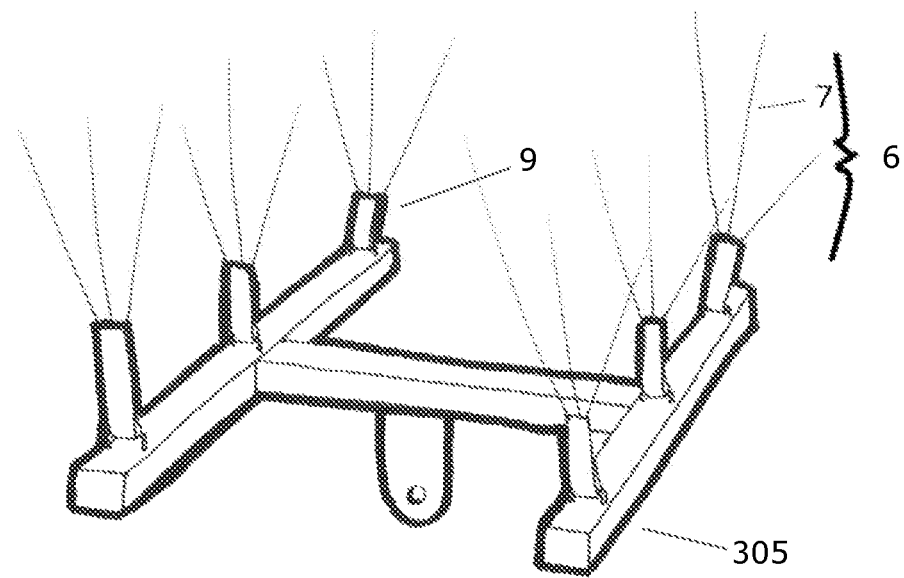

In another embodiment (FIG. 7) the risers 9 attach to the yoke 5, with the left riser 9 attaching to the left side of the yoke 5 and the right riser 9 to the right side of the yoke 5. This configuration provides lateral control of the canopy 1.

In another embodiment (FIG. 8), the risers 9 also split fore and aft so that there is one riser 9 for each row of lines, and for each side of the canopy 1. For this embodiment the left A riser attaches at the front left of the yoke, the right A riser 9 at the front right of the yoke 305, and the B, C etc. risers 9 attach further back on the yoke 305 on their respective sides.

In each of these embodiments attaching the canopy 1 to the pivotably attached yoke 5, 105, 205, 305 means that during launch the yoke 5, 105, 205, 305 follows the motion of the canopy 1, as the canopy 1 rises from the initial launch position on the ground to the flight position above the vehicle 2.

Embodiments of the present invention effectively use the motion of the yoke 5, 105, 205, 305 relative to the vehicle 2 to impart control movements to the canopy 1 to generate restoring forces to counteract any asymmetric motion or misalignment of the canopy 1 relative to the ground vehicle 2 during the take-off run. The orientation (angle) of the yoke 5, 105, 205, 305 relative to the vehicle 2 can be measured using mechanical, hydraulic, electromagnetic or inertial sensors, and if that orientation differs from the flight orientation, the measured difference in orientation can be translated mechanically, hydraulically or electromagnetically, or through an autopilot system, into a control input to the canopy that provides a restoring force of appropriate magnitude and direction to return the canopy 1 and the yoke 5, 105, 205, 305 to the flight orientation.

In one embodiment (FIG. 9) the invention uses a block and tackle 20 between each of the ends of the yoke 5 and the corresponding sides of the vehicle 2 to amplify the change in distance between those points. When a misalignment of the canopy 1 with the vehicle 2 causes the yoke 5 to pivot relative to the vehicle 2 it changes the distance between the ends of the yoke 5 and the sides of the vehicle 2.

In this embodiment, the line through the block and tackle 20 is connected directly to a brake-line that runs to the outer sections of the trailing edge 8b of the canopy 1, so that the line 7 is under minimal tension when the canopy 1 is in the normal flight position relative to the vehicle 2. If the canopy 1 rises asymmetrically the yoke 5 will tip asymmetrically due to its connection to the canopy 1. On one side, the distance between the outer arm of the mechanical yoke 5 and the vehicle body 2 will increase, lengthening the block and tackle 20, and correspondingly shortening the length of the attached brake line by an amount amplified by the arrangement of the block and tackle 20. This in turn applies a brake to the wing of the canopy 1 that has risen higher, which provides a control input that counteracts the side force generated by the asymmetric orientation of the canopy. Simultaneously, the block and tackle 20 on the opposite side of the yoke 5 shortens, releasing the brake on that side, and this lateral arrangement ensures that the vehicle 2 is has roll and yaw stability in take-off, and the canopy 1 becomes aligned and remains aligned above the vehicle in the flight orientation during the take-off run.

Figure 9:
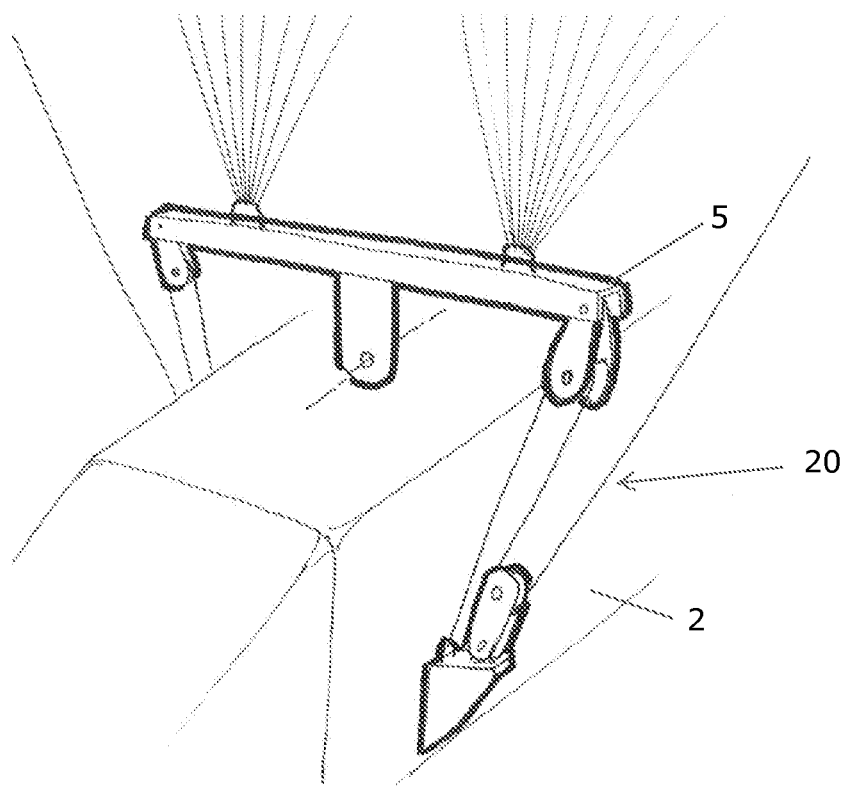
Figure 10:
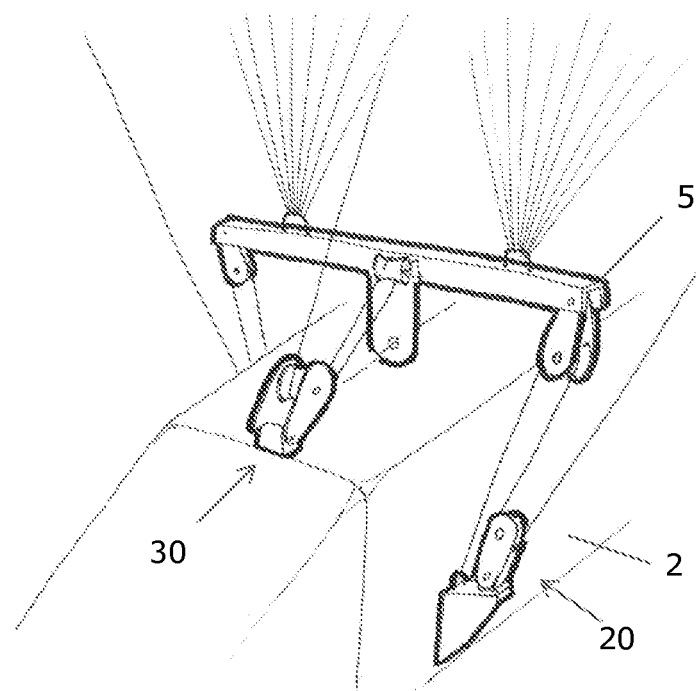
Figure 11:
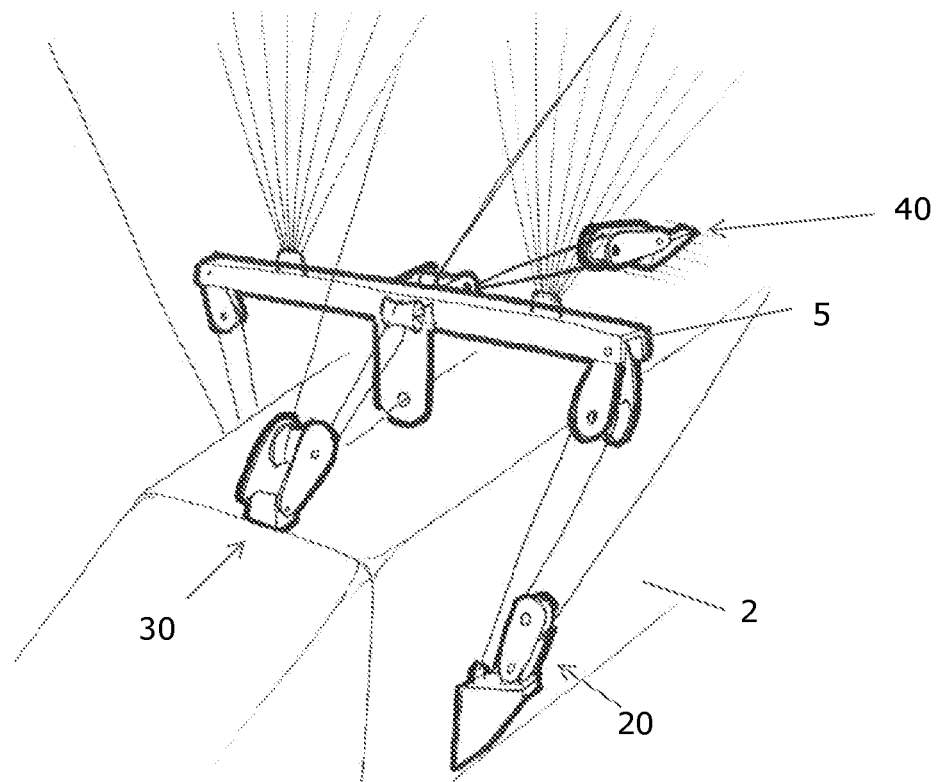

In the embodiment in FIG. 9, the block and tackle 20 is connected between the yoke 5 and the vehicle 2. In the embodiment shown in FIGS. 1 to 3, the block and tackle 20 is connected between the yoke 5 and a vehicle mounting 15. The operation is substantially the same.

In an extension of this embodiment (FIG. 10), a third block and tackle set 30 is attached between the front of the yoke 5 and the vehicle 2 body so that it acts to apply the accelerator when the yoke 5 is pivoted aft of the normal flight orientation (as it is at the start of the launch procedure). This fore-and-aft arrangement provides pitch stability in take-off, and the combination of both fore-and-aft and lateral arrangements provide stability in yaw, pitch and roll.

In a further extension of this embodiment (FIG. 11) a fourth set of block 40 and tackle is attached at the rear of the yoke 5 and acts to shorten the rear risers or the central brake lines if the yoke is pivoted forwards of the normal flight orientation, providing further pitch stability.

Other embodiments of the invention are envisaged. The arrangement above described by block and tackle arrangement could also be achieved by a system of levers, gears, and/or a hydraulic system to give a purely mechanical control system. In another embodiment the mechanical systems could be replaced by electromechanical systems used to sense the motion of the yoke relative to the vehicle, for example with an inertial measurement unit system (IMU e.g. gyros, accelerometers and magnetometers) mounted on the yoke. The IMU senses the attitude of the yoke, and sends signals reporting that attitude to an autopilot system which commands electromechanical servos or other control devices to adjust the control lines to generate control forces to correct that misalignment. This system could involve a single IMU on the yoke (making the assumption that the vehicle is substantially horizontal on the ground and in flight), or could use a second IMU on the vehicle and sense the misalignment between the two IMUs.

In another embodiment (not shown) electronic or electromagnetic position encoders are attached to the yoke and sense the movement of the yoke relative to the vehicle body. These movements are translated into signals transmitted to the vehicle autopilot, which is programmed to respond by commanding electromechanical devices to apply appropriate control inputs to restore the canopy to flight orientation.

The control mechanism of an embodiment of the present invention may be connected to the brake line and/or riser of the line system 6, or may be connected to a separate line which, in turn, is connected to the wing tp. In other words, the control mechanism of an embodiment of the present invention may be auxiliary to the existing line system, or may be retrofit to the existing line system.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A canopy control system comprising:
   a yoke, comprising a plate and an angle sensor to detect an angle of the yoke with respect to a vehicle, the yoke configured to be pivotably securable to the vehicle and securable to a line system of a canopy, wherein the line system securing points are distributed laterally and fore and aft on the plate in use, such that the yoke pivots with respect to the vehicle in a first direction when the canopy is subjected to a wind force; and
   a control mechanism configured to apply a control force to the canopy line system to cause the canopy to oppose the wind force, such that the yoke pivots with respect to the vehicle in a second direction which is opposite to the first direction.

2. A canopy control system according to claim 1, wherein the yoke is configured to pivot laterally with respect to the longitudinal axis of the vehicle.

3. A canopy control system according to claim 1, wherein the yoke is configured to pivot parallel to the longitudinal axis of the vehicle.

4. A canopy control system according to claim 1, wherein the yoke is configured to pivot both laterally with respect to the longitudinal axis of the vehicle and parallel to the longitudinal axis of the vehicle.

5. A canopy control system according to claim 1, wherein the yoke is substantially elongate.

6. A canopy control system according to claim 1, wherein the control system is configured to selectively apply a control force to at least part of the trailing edge of the canopy.

7. A canopy control system according to claim 1, further comprising a mounting for connection to a vehicle, wherein the yoke is pivotably secured to the mounting.

8. A canopy control system according to claim 1, wherein the control mechanism comprises a control line securable at one end to one of the yoke and vehicle, and securable at the other end to the canopy, the control line passable through at least one pulley associated with at least the other of the vehicle and yoke.

9. A canopy arrangement comprising:
   a canopy comprising an aerofoil;
   a line system associated with the canopy; and
   a control system according to claim 1.

10. A canopy arrangement according to claim 9, wherein the line system comprises sets of adjustment lines, each set of adjustment lines connected to a selected region of the canopy to adjust the geometry of a canopy surface.

11. A canopy arrangement according to claim 9, wherein the line system comprises at least one riser, connected at one end to the yoke and connected at the other end to one or more lines.

12. A canopy arrangement according to claim 9, wherein the line system is configured to adjust the geometry of a canopy surface asymmetrically.

13. A paramotor comprising:
a vehicle; and
a canopy arrangement according to claim 9, wherein the yoke is pivotably secured to the vehicle.

14. A paramotor according to claim 13, wherein the yoke is pivotably secured to the vehicle at a point higher than the centre of gravity of the vehicle.

* * * * *